US010109156B2

(12) United States Patent
LaDuca et al.

(10) Patent No.: US 10,109,156 B2
(45) **Date of Patent: *Oct. 23, 2018**

(54) CRISS CROSS POKER CASINO CARD GAME WITH MIDDLE BET AND FIVE CARD BONUS BET

(71) Applicant: AGS LLC, Las Vegas, NV (US)

(72) Inventors: Ronald LaDuca, Cherry Hill, NJ (US); Ofir Ventura, Las Vegas, NV (US)

(73) Assignee: AGS LLC, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/425,205

(22) Filed: Feb. 6, 2017

(65) Prior Publication Data

US 2017/0169668 A1 Jun. 15, 2017

Related U.S. Application Data

(63) Continuation-in-part of application No. 14/315,328, filed on Jun. 26, 2014, now Pat. No. 9,564,016.

(51) Int. Cl.
*G06F 17/00* (2006.01)
*G07F 17/32* (2006.01)

(52) U.S. Cl.
CPC ...... *G07F 17/3293* (2013.01); *G07F 17/3209* (2013.01); *G07F 17/3211* (2013.01); *G07F 17/3225* (2013.01); *G07F 17/3244* (2013.01); *G07F 17/3262* (2013.01)

(58) Field of Classification Search
None
See application file for complete search history.

(56) References Cited

U.S. PATENT DOCUMENTS

| | | | |
|---|---|---|---|
| 5,489,101 | A | 2/1996 | Moody |
| 5,531,448 | A | 7/1996 | Moody |
| 5,657,993 | A | 8/1997 | Merlino et al. |
| 5,951,012 | A | 10/1999 | Feola |
| 5,975,529 | A | 11/1999 | de Keller |
| 6,042,118 | A | 3/2000 | Poitra |

(Continued)

FOREIGN PATENT DOCUMENTS

WO 2015/123386 8/2015

OTHER PUBLICATIONS

International Search Report for PCT/US2015/015558 filed Feb. 12, 2015, dated May 18, 2015, in 3 pages.

(Continued)

*Primary Examiner* — Ronald Laneau
(74) *Attorney, Agent, or Firm* — Weide & Miller, Ltd.

(57) ABSTRACT

One step of the present method involves making an across ante and a down ante and an optional five card poker bet. Other steps involve making an across bet or folding, making a down bet or folding, and making a middle bet or folding. All winning bets are paid out against a designated payout table for that bet. A winning middle bet is paid to the higher of the two five card poker hands formed by the players two dealt cards and either the three across community cards or the three down community cards. A winning five card bonus bet is paid to a winning five card poker hand formed by the five community cards forming the cross. The method may be played on criss cross poker layouts on actual or simulated casino card tables or on electronic devices.

11 Claims, 6 Drawing Sheets

(56) References Cited

U.S. PATENT DOCUMENTS

| | | | |
|---|---|---|---|
| 6,048,267 | A | 4/2000 | Wichinsky |
| 6,817,615 | B1 | 11/2004 | Dacey |
| 7,341,510 | B2 | 3/2008 | Bourbour et al. |
| 7,510,190 | B2 | 3/2009 | Snow et al. |
| 7,584,967 | B2 | 9/2009 | Webb et al. |
| 7,628,689 | B2 * | 12/2009 | Snow ........................ A63F 1/00 273/292 |
| 8,128,091 | B2 * | 3/2012 | Snow ...................... G07F 17/32 273/292 |
| 8,585,478 | B2 | 11/2013 | Smith et al. |
| 8,590,900 | B2 | 11/2013 | Yoseloff |
| 9,129,487 | B2 * | 9/2015 | Snow .................. A63F 3/00157 |
| 9,183,705 | B2 * | 11/2015 | Yoseloff .............. G07F 17/3267 |
| 2005/0242506 | A1 | 11/2005 | Yoseloff |
| 2006/0255541 | A1 | 11/2006 | McBride |
| 2006/0270477 | A1 | 11/2006 | Snow |
| 2006/0273518 | A1 | 12/2006 | Aida |
| 2006/0281513 | A1 | 12/2006 | Kirkpatrick |
| 2008/0136104 | A1 | 6/2008 | Matanky |
| 2008/0318652 | A1 | 12/2008 | Lima et al. |
| 2010/0105460 | A1 | 4/2010 | Makhoul et al. |
| 2012/0149451 | A1 | 6/2012 | Nicely et al. |
| 2012/0225706 | A1 | 9/2012 | Yoseloff |

OTHER PUBLICATIONS

Written Opinion for PCT/US2015/015558 filed Feb. 12, 2015, dated May 18, 2015, in 7 pages.

Mississippi Stud, Shuffle Entertainment, Inc., http://www.wsgc.wa.gov/activities/game-rules/mississippi-stud.pdf, 17 pages, Oct. 28, 2014.

Written Opinion for International Application No. PCT/US2017/068712 dated Apr. 17, 2018, 9 pages.

Search Report and Written Opinion for International Application No. PCT/US2017/068712 dated Apr. 17, 2018, 7 pages.

* cited by examiner

CRISS CROSS POKER CASINO CARD GAME WITH MIDDLE BET AND FIVE CARD BONUS BET

CROSS REFERENCE TO RELATED APPLICATION

This application is a continuation-in-part of U.S. application Ser. No. 14/315,328 which was filed on Jun. 26, 2014.

BACKGROUND

1. Field

The disclosed embodiments relate to casino card games and more particularly to a method of playing a criss cross poker casino card game with an additional middle bet and an optional five card bonus using the same board cards as the criss cross poker game without altering the play of the criss cross poker casino card game.

2. Description of Related Art Including Information Disclosed Under 37 CFR 1.97 and 1.98

Gamblers enjoy side betting in games to double the opportunity of winning and just to have another opportunity to gamble. But there is also a need to preserve the integrity of the game being played to maintain the original unadulterated use of cards and play so that the original card game is not altered by the optional side betting game and that players can play the original casino card game without the optional side betting if they choose. Prior art casino card games related to criss cross poker, which provide a number of community cards dealt face down on a playing table to be combined with cards dealt to each player often provide two possible five card poker hands comprised of two different sets of community cards in combination with a players dealt cards. But none of the prior art games provide an optional extra side bet on the community cards themselves forming a winning hand. Prior art casino card games based on a criss cross type of configuration generally provide betting opportunities on player cards combined with one or the other of two different sets of community cards, but not the option of a third bet on both sets of community cards combined with the player cards that pays if either of the two combinations provide a winning hand.

Poker games played against other players and/or against a dealer hand add a level of difficulty and human judgment which complicates winning rather than just winning on the value of the cards themselves against a payout table. The payout table game provides a faster game and more certainty on the part of the player that a hand will pay off, even if the player lacks competitive play skill, and also does not depend upon how good or how bad the hands of the other players or the dealer may be.

U.S. Patent Application #US20120149451, published Jun. 14, 2012 by Nicely et al, discloses a gaming device which provides a single player poker game including one or more opportunities for forming player hands. In one embodiment, for a play of the poker game, a player places a wager on each of a plurality of player hands. The gaming device provides the player with one or more opportunities to fold one or more of the player hands and withdraw the wager associated with the folded hand. A number of community cards are dealt. The gaming device determines and provides any awards associated with a ranking of each of the remaining player hands according to a paytable.

U.S. Patent No. 62/048,267, issued Apr. 11, 2000 to Wichinsky, indicates a multiple hand stud poker game wherein a player wagers on one or multiple hands and using a single standard fifty-two card deck of playing cards. Three cards are dealt face up to each of the player hands. Two cards are then dealt—one face up and one face down—to be used as cards that can be selected by the player for use in the player's hand. The player selects either the face up card or the face down card. The selected card is added to the player's first hand and is displayed face up. The unselected card is then discarded. Two more cards are dealt—one card face up and one card face down. The player again selects either the face up card or the face down card. The selected card is added to the player's second hand and is displayed face up with the unselected card being discarded. Two more cards are dealt—one card face up and one card face down. The player again selects either the face up card or the face down card. The selected card is added to the player's third hand and is displayed face up with the unselected card being discarded. The same procedure is used to add a fifth card to each of the player's hands. This results in the player having three complete five card hands. The amount won by the player is based on the amount wagered by the player and the poker ranking of the player's hand based on a payout schedule.

U.S. Pat. No. 6,042,118 issued to Poitra, describes a method of playing a poker-type game wherein the game provides the players an opportunity to increase the amount wagered based upon two of three community cards shown. After each player places a bet, two cards are dealt face down to each player and three cards are dealt face down to the dealer that are "community cards". The dealer then turns over two of the three community cards so that they are facing up. Each player has the opportunity to "double-down". The dealer then turns over the remaining community card and then turns over each player's two cards. The bets are resolved by using the three community cards in combination with each player's two cards based upon a predetermined plurality of winning card combinations similar to poker. The card deck is a standard 52 card deck with one joker to make a 53 card deck. The joker is utilized only in certain combinations as a 'wild card.

U.S. Patent Applications #US20050242506, published Nov. 3, 2005 and #US20120225706, published Sep. 6, 2012 both Mississippi Stud variations by Yoseloff, claim a card game played against a pay table, wherein the player receives a partial hand that is preferably completed by community cards (but may be completed by cards dealt directly to a hand or a combination of cards dealt directly to a hand and at least one community card or Wild card). After placement of an Ante Wager, each player Will have an opportunity to place a game Wager before receiving another card for the player's hand (Whether dealt directly to the player or as a community card revealed to all players). At least some or all game Wagers may be an amount within a range of multiples of the player (such as 1×, 2×, 3× 4× or 5× the amount of the Ante Wager). The range of Wagers may remain the same or vary with the number of dealt cards or community card revealed to the players.

U.S. Pat. Nos. 5,489,101 and 5,531,448, issued to Moody, describe poker games in which a player attempts to form a five card poker hand that has the highest poker hand ranking. In the house banked version, all players play against the house and not against each other. The game is played with a standard fifty-two card deck. The game is played by a dealer and from one to seven players. Each player makes a bet and a portion of each bet may be allocated to a progressive jackpot. The dealer deals five cards to each player. The dealer then deals six cards as the community cards which are arranged face down in three rows in a triangle pattern on the gaming table layout. The players may discard from none to five unwanted cards. The dealer turns up the community cards and pre-designated groups of cards from the community cards are used for each player to make a complete five card poker hand. The dealer determines the best hand each player has made according to poker hand rankings. All winning hands will be paid by the dealer according to the odds listed in the pay table. When the progressive jackpot payout is used, the dealer examines the six community cards to determine if one of the predetermined card arrangements has occurred. Any winning payouts from the progressive jackpot are distributed to the players at the table. The method may also be played as a player banked game or as a pot game. In one embodiment, the dealer deals three cards to each player. The dealer then deals eight cards as the community cards which are arranged in groups or pairs of two cards each on the gaming table layout. In a preferred embodiment, the card layout is in the format of a directional compass with a pair of cards each at the North position, East position, South position and West position, respectively.

U.S. Pat. No. 5,657,993, issued to Merlino, describes a method of playing a poker-type wagering game on top of a table layout having first and second player locations, a plurality of betting areas associated with each of the player locations and a community card area. The method includes a first player placing a wager on top of each of the betting areas associated with the first player location. A second player places a wager on top of each of the betting areas associated with the second player location. Each player receives two playing cards. A number of community cards are dealt face down in the community card area in a predetermined pattern. The number of community cards corresponds to the number of betting areas in one of the player locations. The faces of community cards are exposed in succession. Each time a community card is exposed, each of the players can either fold wherein the folding player loses a number of wagers which corresponds to the number of community cards exposed or the players can leave all of the wagers on the corresponding betting areas until all of community cards are exposed. Once all of the community cards are exposed, each of the players combines his or her pair of cards with three of the community cards to form a completed stud poker hand. The player with the highest ranking hand wins all of the wagers.

U.S. Pat. No. 5,975,529, issued to de Keller, describes a poker game played on a blackjack style table with a single dealer. The player opening the betting is rotated for each game. The game is played with chips/counters of various denominations. At the start of each game all players place a bet of equal value in their respective pots. Players then place Bet 1 (the maximum and minimum value thereof being determined by the house) and each player is dealt two cards (this number may vary), face-down, and the dealer receives three cards (this number may vary) one face-up and two face-down. The three dealer's cards are community cards, referred to as the 'flop' and complete each player's hand. The players, at this stage know the identity of three cards and each player has the option of discarding their first or second card, or both, face down. Replacements, face-down, are received for discards. Players may at this stage, either 'stand' by making no further bets or 'raise' by wagering on Bet 2. The Bet 2 wager must be exactly equal in value to the amount wagered on Bet 1. When all wagers have been placed on Bet 2 the fourth card is revealed by the dealer. Players may again either stand at this stage or raise by wagering on Bet 3. Players are not permitted to make a third bet if they have not placed the second. The Bet 3 wager must be exactly equal in value to the amount wagered on Bet 1. When all third bets have been placed the dealer turns up the fifth card. Each player reveals his/her cards and provided they show a winning hand on the list of poker rankings hands are paid according to the total stake placed at the corresponding pay-offs/odds. The player with the highest poker hand is awarded all the Pot bets; in the event of players holding identical hands the Pot is shared. No matter how many cards constitute community cards or how many cards are dealt to each player, the players select five cards to make up their hands. There is no variation in wagering allowed, and competition includes wagers against the pot.

What is needed is a method of playing a criss cross poker casino card game combined with an additional middle card bet and an optional five card poker bonus bet wherein a player competes solely against posted payout tables and the additional and optional bets use the same cards as the criss cross poker casino card game without interfering with the regular play of the criss cross poker casino card game.

SUMMARY

An object of the disclosed embodiments is to provide a method of playing a criss cross poker casino card game combined with an additional middle card bet and an optional five card poker bonus bet wherein a player competes solely against posted payout tables and the additional and optional bets use the same cards as the criss cross poker casino card game without interfering with the regular play of the criss cross poker casino card game, wherein the additional additional middle bet is for the higher winning poker hand of the two poker hands formed by combining the player's two dealt cards with either the across three community cards or the down three community cards and the five card bonus bet is for a winning five card poker hand formed by the five criss cross community cards.

Another object of the disclosed embodiments is to provide a method of playing a criss cross poker casino card game combined with an additional middle card bet and an optional five card poker bonus bet wherein the player competes solely against posted payout tables by placing two ante wagers of equal amounts within the posted minimum and maximum wagers, and then placing up to three separate bet wagers one to three times an ante wager and an optional five card bonus wager according to betting limits set by the casino for minimum and maximum five card bonus bet amounts.

In brief, an across ante and a down ante are made to start the game according to the table betting amounts. An optional five card bonus bet may be placed according to betting limits set by the casino for the minimum and maximum five card bonus bet amounts.

Five community cards are dealt face down for all players to use in combination with two cards dealt face down to each player. The community cards are placed on the table in the configuration of a cross with a middle card and an outside card on each side of the middle card forming three community horizontal "Across Cards" and the middle card and outside cards above and below the middle card forming three community vertical "Down Cards".

After the cards are dealt, a player may place an "Across Bet" of one to three times the ante that the players two dealt cards in combination with the three ""Across Cards" form a winning five-card poker hand against a payout table. Alternately, the player may fold and forfeit the two antes. The two outside horizontal or across cards are then turned over by the dealer.

A player may then place a "Down Bet" that the player's two dealt cards in combination with the three "Down Cards" form a winning five-card poker hand against a payout table. Alternately the player may fold and forfeit the antes and the across bet. Then the two outside vertical or down cards are then turned over by the dealer.

At this time the player may place a "Middle Bet" that the player's two dealt cards in combination with either the three community across cards or the three community down cards forms a winning hand, with the higher hand being paid out according to a payout table. Alternately the player may fold and forfeit the antes, the across bet, and the down bet. The dealer then turns over the middle community card.

After the middle card is turned up, all winning bets are paid: the across bet, the down bet, and the middle bet are paid according to a criss cross payout table. The across ante and the down ante are paid according to the ante payout table. If the five community criss cross cards used together as a five card poker hand is a winning hand, the five card bonus bets are paid according to a five card bonus payout table.

The additional middle bet and the optional five card bonus bet are played with the same cards as the criss cross poker casino card game and do not affect the play of the criss cross poker casino card game. They provide additional betting opportunities in the criss cross poker casino card game.

BRIEF DESCRIPTION OF THE DRAWINGS

These and other details of the present invention will be described in connection with the accompanying drawings, which are furnished only by way of illustration and not in limitation of the invention, and in which drawings.

DETAILED DESCRIPTION OF EMBODIMENTS

In FIGS. 1-6, the disclosed embodiments comprise a method of playing a criss cross poker casino card game combined with an additional middle card bet and an optional five card poker bonus bet wherein a player competes solely against posted payout tables and the additional and optional bets use the same cards as the criss cross poker casino card game without interfering with the regular play of the criss cross poker casino card game.

Figure 1:
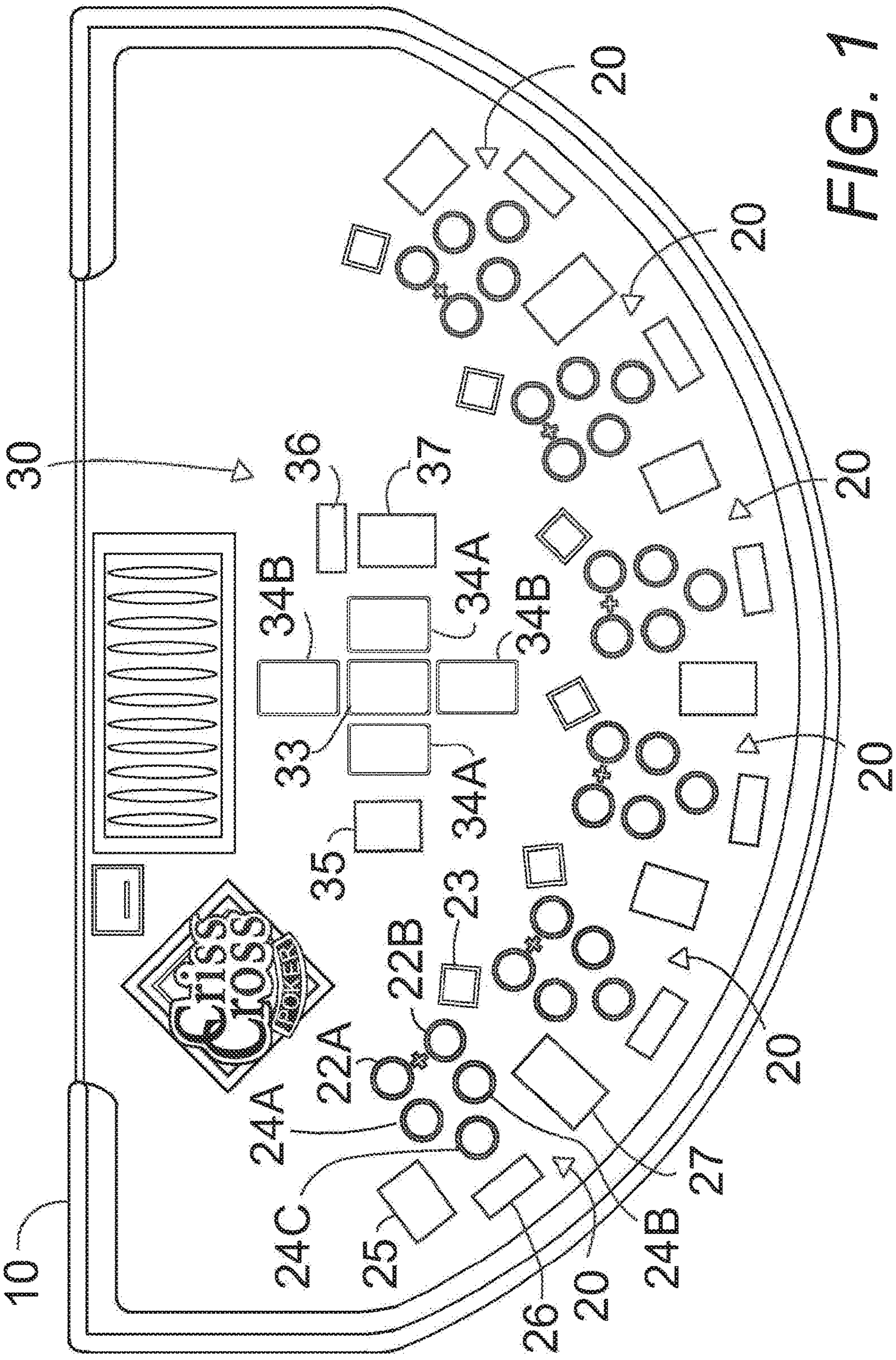
FIG. 1 is a plan view of a casino card game playing table layout for the criss cross poker casino card game combined with an additional middle bet and an optional five card bonus bet, showing the player layouts and pay tables facing the players and the dealer layout with the five criss cross community cards and pay tables facing the dealer on the other side of the playing table from the players, and showing an additional middle bet circle and five card bonus bet diamond, and an additional payout table for the five card bonus bet marked in each player layout.
Figure 2:
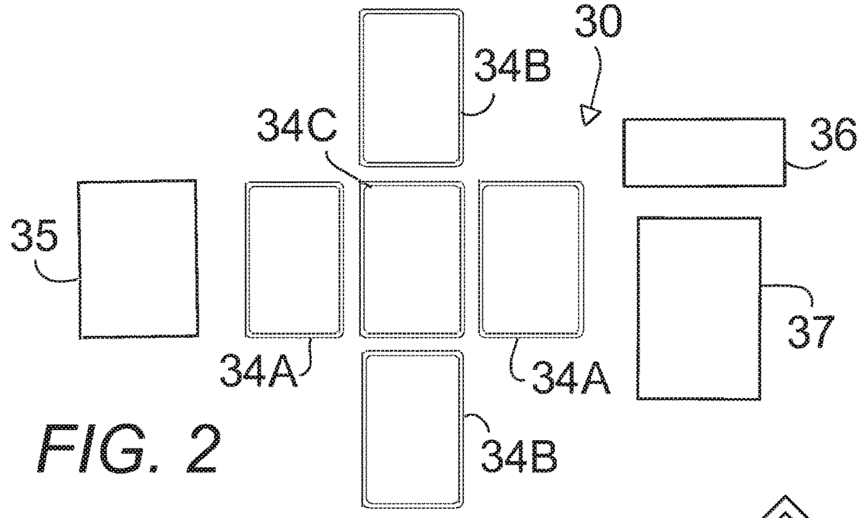
FIG. 2 is an exploded plan view showing the five criss cross community cards and pay tables facing the dealer from the layout of FIG. 1 for the criss cross poker casino card game combined with an additional middle bet and an optional five card bonus bet.
Figure 3:
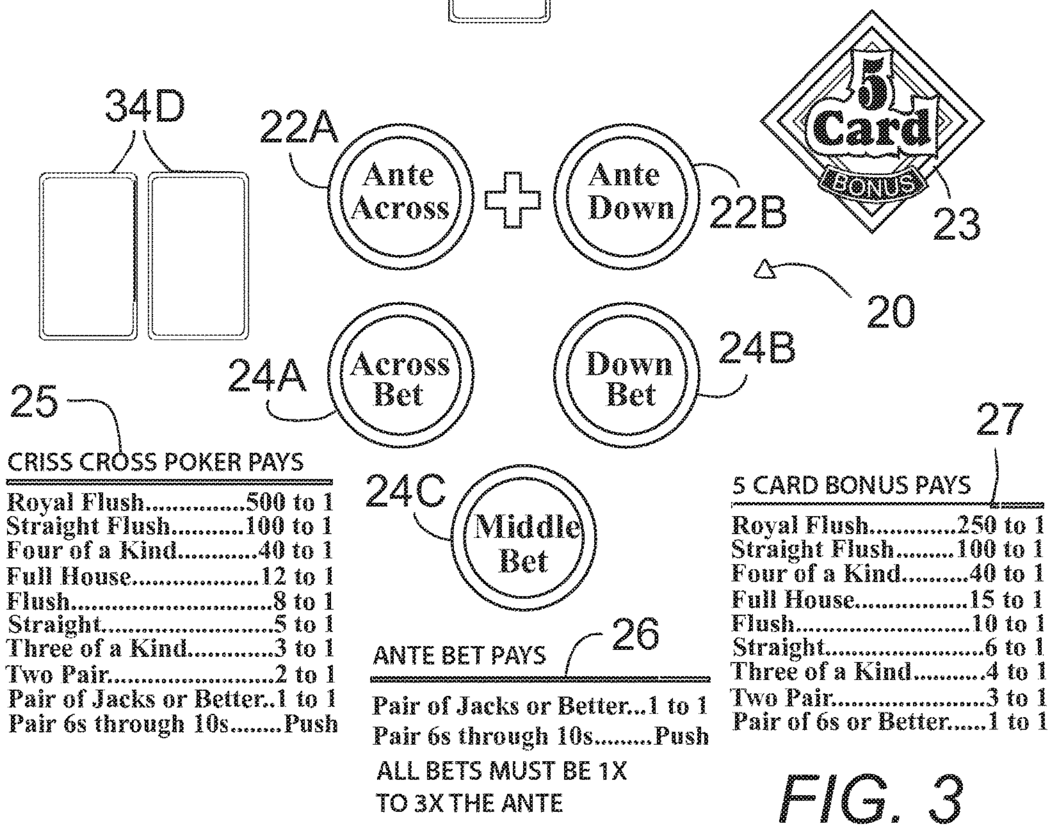
FIG. 3 is an exploded plan view showing the player layout with demarked player betting locations and payout tables of FIG. 1 for the criss cross poker casino card game combined with an additional middle bet and an optional five card bonus bet.

The method comprises:

a) a first step of providing a standard 52-card deck of playing cards for playing a standard poker casino card game;

b) a second step of providing a playing layout 10, as shown in FIGS. 1-3, comprising: a demarcation of a criss cross card layout configuration for dealing five community cards on the criss cross card layout, in the dealer layout 30 as shown in FIGS. 1 and 2, to form a cross formation having a middle card 33 and two outer side cards 34A forming a horizontal across partial hand and a top and a bottom outside cards 34B together with the same middle card 33 forming a vertical down partial hand, as well as a dealer criss cross poker payout table 35, dealer ante payout table 36, and dealer five card bonus payout table 37, all facing the dealer; at least one first betting location 20 for at least one player, as shown in FIGS. 1 and 3, the at least one betting location 20 demarking: an across ante location 22A, a down ante location 22B, an across bet location 24A, a down bet location 24B, a middle bet location 24C, and a five card bonus bet location 23 (other betting locations may be provided based on other bets which may be offered as discussed in more detail below), at least one ante payout table 26 indicating payout odds for ante bets for playing a standard criss cross poker casino card game, at least one across bet and down bet and middle bet criss cross poker payout table 25 indicating payout odds for playing a standard criss cross poker casino card game having a middle bet; at least one five card bonus bet payout table 27 indicating payout odds for an optional five card bonus bet;

c) a third step of placing two ante bets of equal value, a first ante bet on an across hand, the first ante placed in an Across Ante 22A marked player portion of a casino table layout, and a second ante bet on a down hand, the second ante placed in a Down Ante 22B marked player portion of the casino table layout in front of each player;

d) a fourth step of placing an optional five card poker hand bonus bet in a Five-Card Bonus 23 marked location on the player portion of the casino table layout in front of each player;

e) a fifth step of dealing five community cards placed in front of the dealer in the dealer layout 30, face down in a cross formation having a middle card 33 and two side cards 34A forming a horizontal across partial hand and a top and a bottom card 34B together with the same middle card 33 forming a vertical down partial hand;

f) a sixth step of dealing two cards 34D, as shown in FIG. 3, face down to each player, the three cards of the across partial hand 33 and 34A and the three cards of the vertical down partial hand 33 and 34B each usable separately with each player's two dealt cards 34D to form a five card poker hand;

g) a seventh step of placing an across bet in an Across Bet 24A marked location on the player portion of the casino table player layout 20 in front of each player making the bet to bet on making a winning poker hand using the player's two dealt cards 34D with the three horizontal community across cards 33 and 34A, or an alternate sixth step of forfeiting the ante bets and folding the player cards;

h) an eighth step of turning over the two horizontal outside cards 34A to the right and left of the middle community card 33;

i) a ninth step of placing a down bet in a Down Bet 24B marked location on the player portion of the casino table player layout 20 in front of each player making the bet to bet on making a winning poker hand using the player's two dealt cards 34D with the three vertical community down cards 33 and 34B, or an alternate eighth step of forfeiting the ante bets and across bet and folding the player cards;

j) a tenth step of turning over the two vertical outside cards 34B above and below the middle community card 33;

k) an eleventh step of placing an additional middle bet in a Middle Bet 24C marked location on the player layout 20 portion of the casino table layout in front of each player making the bet to bet on making a winning poker hand using the player's two dealt cards 34D with either the three horizontal community across cards 33 and 34A or the three vertical community down cards 33 and 34D, or an alternate tenth step of forfeiting the ante bets and the across bet and the down bet and folding the player cards;

l) a twelfth step of turning over the middle community card 33;

m) a thirteenth step of paying out winning player across bets 24A on winning across hands comprised of the player's two dealt cards 34D and three community horizontal across cards 33 and 34A forming a five card poker hand paid out according to the criss cross poker payout table 25;

n) a fourteenth step of paying out winning player down bets 24B on winning down hands comprised of the player's two dealt cards 34D and three community vertical down cards 33 and 34B forming a five card poker hand paid out according to the criss cross poker payout table 25;

o) a fifteenth step of paying out winning player middle bets 24C on the higher winning hand of two hands both using the middle card 33 and the player's two dealt cards 34D, either a winning across hand with the outside horizontal across community cards 34A or a winning down hand with the outside vertical down community cards 34B paid out according to the criss cross poker payout table 25;

p) a sixteenth step of paying out any winning ante bets 22A and 22B according to the ante payout table 26;

q) a seventeenth step of paying out five card bonus bets 23 on the five community cards 33, 34A and 34B of the criss cross card layout forming a winning five card poker hand paid out according to the five card bonus payout table 27;

thereby providing a method of playing a criss cross poker casino card game combined with an additional middle card bet and an optional five card poker bonus bet wherein a player competes solely against posted payout tables and the additional and optional bets use the same cards as the criss cross poker casino card game without interfering with the regular play of the criss cross poker casino card game.

The fourth step of placing an optional five card poker hand bonus bet 23 comprises placing an optional five card bonus bet according to betting limits set by the casino for minimum and maximum five card bonus bet amounts.

The seventh step of placing an across bet 24A comprises placing an across bet of one to three times an ante bet.

The ninth step of placing a down bet 24B comprises placing a down bet of one to three times an ante bet.

The eleventh step of placing a middle bet 24C comprises placing a middle bet of one to three times an ante bet.

Paying out the winning player across bets 24A, down bets 24B, and middle bets 24C comprises paying out the bets according to the criss cross poker payout table 25, as shown in FIG. 3, paying out: 500 to 1 for a royal flush, 100 to 1 for a straight flush, 40 to 1 for four of a kind, 12 to 1 for a full house, 8 to 1 for a flush, 5 to 1 for a straight, 3 to 1 for three of a kind, 2 to 1 for two pair, 1 to 1 for a pair of jacks or better, and push for a pair of sixes to a pair of tens.

Paying out winning ante bets 22A and 22B comprises paying out according to an ante payout table 26, as shown in FIG. 3, paying out: 1 to 1 for a pair of jacks or better, and push for a pair of sixes to a pair of tens.

Paying out winning five card bonus bets 23 comprises paying out winning five card poker hands formed by the five community cards of the cross according to the five card bonus payout table 27, is shown in FIG. 3, paying out: 250 to 1 for a royal flush, 100 to 1 for a straight flush, 40 to 1 for four of a kind, 15 to 1 for a full house, 10 to 1 for a flush, 6 to 1 for a straight, 4 to 1 for three of a kind, 3 to 1 for two pair, and 1 to 1 for a pair of sixes or better.

In FIG. 1, the second step of the method of playing the criss cross poker casino card game combined with an additional middle card bet and an optional five card poker bonus bet comprises providing the playing layout 10 on a casino gaming table having at least one player layout 20 for at least one player sitting at the casino gaming table having a dealer layout 30 for a dealer at the casino gaming table to play the criss cross poker casino card game combined with an additional middle card bet 24C and an optional five card poker bonus bet 23 according to the disclosed method.

The second step of the method of playing the criss cross poker casino card game combined with an additional middle card bet 24C and an optional five card poker bonus bet 23 may alternately comprise providing the playing layout 10 on a mechanical simulation device, such as a roll-up or fold-up layout as part of a boxed game or portable set for use at home or at a charitable event or party, with the same layout 10 as in the casino table layout of FIG. 1, for at least one player to play the combined criss cross poker casino card game combined with an additional middle card bet 24C and an optional five card poker bonus bet 23 according to the disclosed method.

The casino gaming table in FIG. 1 may be an electronic gaming table which may be a part of an electronic gaming table system. The electronic gaming table may include a data processor connected to one or more video displays (such as LCD, LED, plasma, etc.) viewable at the gaming table. The at least one player layout 20 may include a player interface that communicates with the data processor. The player interface may include an input device to communicate input from a player to the data processor. For example, the player interface may include a button panel, mouse, keyboard, keypad, pointer, or the like. In an optional embodiment, the player interface may be integrated with the display into a touch screen display which is configured to receive input and display output.

In one embodiment, the ante bets, across bet, down bet, middle bet, and optional five-card bonus bet are received through the player interface. The receipt of the ante bets, across bet, down bet, middle bet, and optional five-card bonus bet (or other bets or wagers described herein) may occur through physical receipt of the bet amounts through the player interface, such as receiving currency through a bill acceptor, coins through a coin receiver, a ticket or voucher through a ticket reader, account information through a keypad or magnetic card reader, or the like. Alternatively, receipt of the ante bets, across bet, down bet, middle bet, and optional five-card bonus bet (or other bets/wagers described herein) may occur through receipt of input designating wager amounts to be allocated from a stored register of game credits (for example, a player might provide monetary value to the electronic gaming table via transfer from an account, via currency or a ticket, credit card or the like, thus creating a player credit balance in association with the table, and wherein the player then provides bet or wager inputs for wagering the credits associated with that balance). In another embodiment, the electronic gaming table may include other types of wager accepting devices. For example, the electronic gaming table may include one or more chip sensors which are configured to detect the input of a wager by a player by detecting the presence of a wagering value chip at, on or near the sensor, or by detecting other player input to the sensor. For example, the sensor might be an RFID sensor which detects the chip or a proximity sensor which detects the chip. Likewise, winnings may be paid in the form of chips, or by crediting credits to the player's credit balance (such as via the processor of the gaming table). The player may cash out those credits, such as by transferring them to an account, cashing them out in the form of chips, monies or the like)

Figure 4:
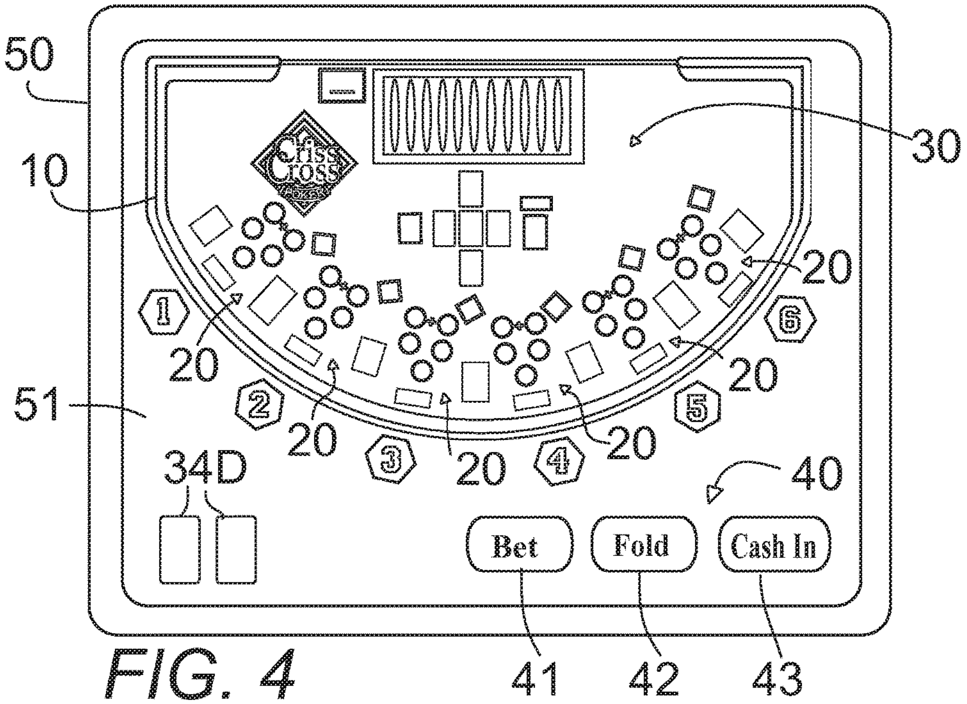
FIG. 4 is an elevational view of a simulation of the casino card game playing table layout of FIG. 1 for the criss cross poker casino card game combined with an additional middle bet and an optional five card bonus bet, shown on a screen of an electronic simulation, showing a simulation of the player layouts and payout tables and the dealer layout with the criss cross community cards and payout tables, and a player card layout showing the player's two dealt cards, and the control areas for the player to activate in making choices during the play of the criss cross poker casino card game combined with an additional middle bet and an optional five card bonus bet.
Figure 5:
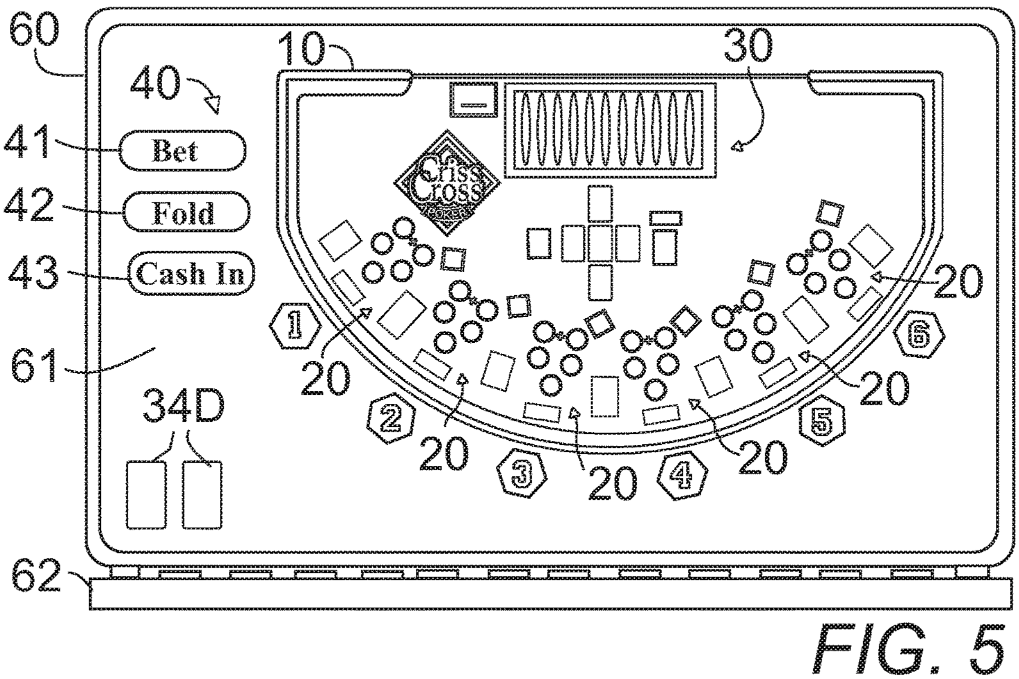
FIG. 5 is an elevational view of a simulation of the playing table layout of FIG. 1 for the criss cross poker casino card game combined with an additional middle bet and an optional five card bonus bet, shown on a screen of a computer device showing a simulation of the player layouts with betting areas and payout tables and a simulation of the player's two dealt cards, and the dealer layout and pay table and the criss cross layout of the five community cards, and the control areas for the player to activate in making choices during the play of the criss cross poker casino card game combined with an additional middle bet and an optional five card bonus bet.
Figure 6:
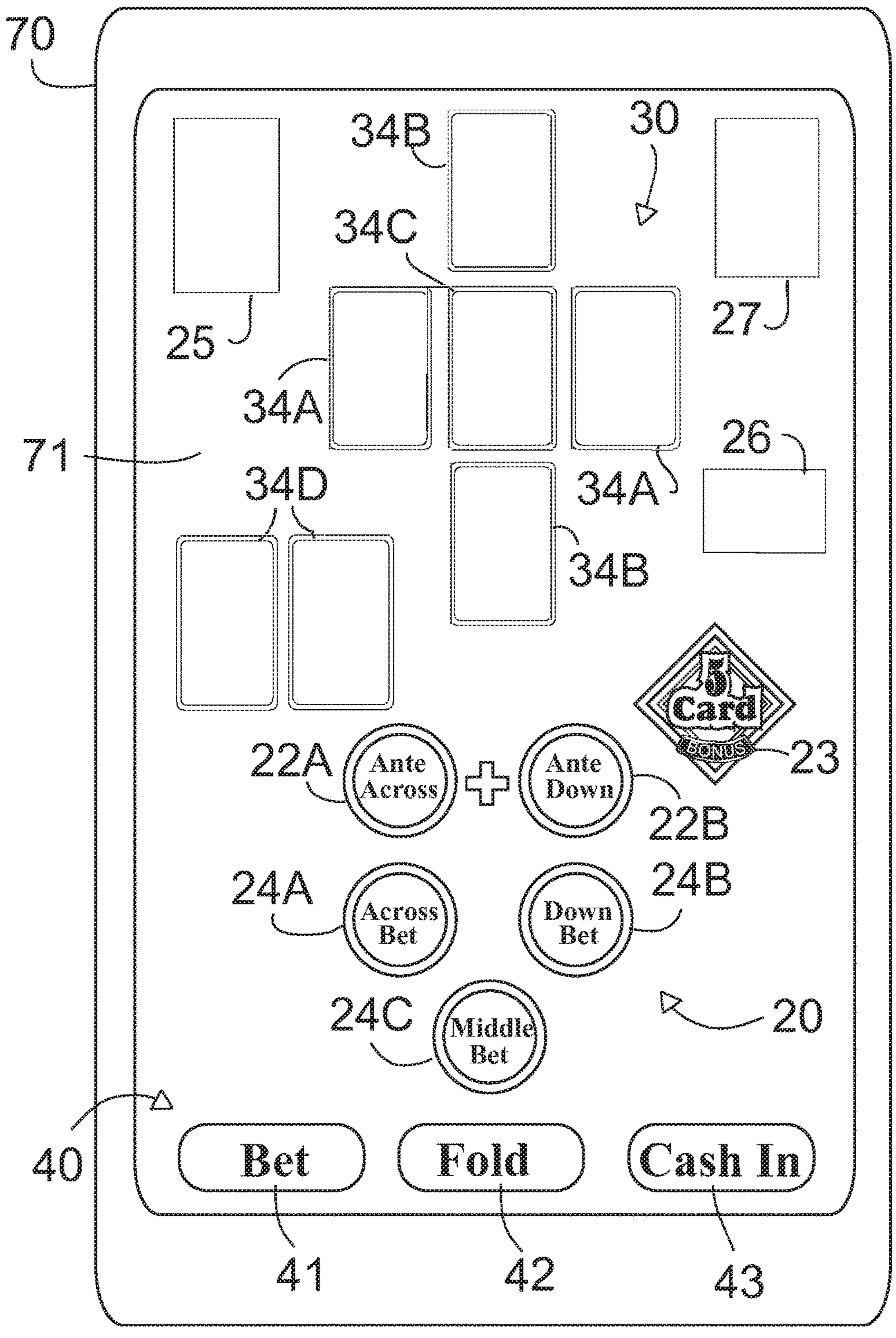
FIG. 6 is an elevational view of a simulation of a player layout for the playing table layout of FIG. 1 for the criss cross poker casino card game combined with an additional middle bet and an optional five card bonus bet, shown on a touch screen of a wireless device showing a simulation of a player layout with betting areas and payout tables and a simulation of the player's two dealt cards, and the criss cross layout of the five community cards, and the control areas for the player to activate in making choices during the play of the criss cross poker casino card game combined with an additional middle bet and an optional five card bonus bet.

The second step of the method of playing the criss cross poker casino card game combined with an additional middle card bet 24C and an optional five card poker bonus bet 23 may alternately comprise providing the playing layout on any of a variety of simulation devices, such as electronic simulation devices 50, 60, and 70, as shown in FIGS. 4-6, with the criss cross poker layout 10 appearing electronically on a viewing screen 51, 61, and 71 which further comprises providing a plurality of control areas 40 on the electronic viewing screen for the at least one player to activate to control the electronic simulation device in making player choices during the play, for at least one player to play the criss cross poker casino card game combined with an additional middle bet 24C and an optional five card poker bonus bet 23 according to the disclosed method.

In FIG. 6, the second step of the method of playing the criss cross poker casino card game combined with an additional middle bet 24C and an optional five card poker bonus bet 23 comprises providing a single player portion 20 with betting areas 22A, 22B, 23, 24A-24C and player payout tables 25-27 as well as the criss cross community cards 34A-34C in the dealer portion 30 of the playing layout 10 on a handheld electronic simulation device 70, such as a smart phone or tablet, the handheld electronic simulation device comprising a touch screen 71 as the means for displaying the player portion 20 and dealer portion 30 as well as the means for interacting with the handheld electronic simulation device. The touch screen comprising a plurality of designated control areas 40 on the electronic viewing screen 71 for the at least one player to activate by touching appropriate designated control areas of the screen to control the electronic simulation device in making player choices during the play of the criss cross poker casino card game combined with an additional middle card bet 24C and an optional five card poker bonus bet 23 according to the disclosed method.

In FIGS. 4 and 5, player locations on the multi-player electronic devices 50 and 60 are demarked by player numbers 1-6 within hexagonal outlines at a designated table location around the simulated game layout 10 on the screen 51 and 61. In FIGS. 4-6, in using the disclosed method on an electronic device 50, 60, or 70, interactions are made by a player using a mouse or keyboard input or a touch screen input to activate each bet area: once for each ante in the across ante 22A and down ante 22B betting areas and then activate each of the other betting areas 23 and 24A-24C once for each ante amount of the bet, once for one time the ante bet, twice for two times the ante bet, and three times for three times the ante bet and then activate the Bet area 41 when the player betting is finished for that turn or alternately activate the Fold area 42 when the player is not betting. When the player is finished playing the game, at the end of a round of play, the player activates the Cash In area 43 to cash in the player's winnings.

The electronic device, such as a computer 60 or a mobile device 70, may have a connection to a remote network to play the criss cross poker casino card game combined with an additional middle card bet 24C and an optional five card poker bonus bet 23 according to the disclosed method. The electronic device having a connection to a remote network to play the criss cross poker casino card game combined with an additional middle card bet 24C and an optional five card poker bonus bet 23 according to the disclosed method on an electronic device taken from the list of electronic devices including a computer, a handheld device, a telephonic device, an entertainment device, a gaming device, and a television device.

When the game is presented or played at a gaming table, whether a non-electronic gaming table or an electronic gaming table, the game may be played by dealing physical playing card, such as from one or more decks of standard playing cards (comprising cards having a back which does not display card rank and suit information and a front which displays card rank and suit information, such as the card ranks 2, 3, 4, 5, 6, 7, 8, 9, 10, Jack, Queen, King and Ace, each of the four suits Hearts, Diamonds, Spades and Clubs). In one embodiment, the cards may be provided by an electro-mechanical or mechanical card shuffling device which is located at or near the table. For example, one or more decks of cards may be input to the shuffling device and then one or more decks of shuffled cards may be delivered to a dealer by that device, and from which the dealer deals the cards. As described herein, in an electronic gaming table configuration one or more electronic display devices may be configured to display graphically displayed card images (either images of actual cards or graphical representations of cards). In the case of an electronic gaming table in which images of cards are displayed, the gaming table may not include a live dealer. In other embodiments, the electronic gaming table may be configured to present a live dealer game, such as where a remote dealer deals physical cards and images of those cards are displayed by the device (such a configuration may be applied to a gaming machine, hand-held device or the like as well).

In a preferred embodiment, the methods of game play and presentation are implemented via a gaming machine or gaming system. Such a gaming machine may have various configurations.

The gaming machine may be located at a casino (and as such may be referred to as a "casino gaming machine"). As described below, the gaming machine may be part of a gaming system, such as a casino gaming system which links two or more of the gaming machines or one or more gaming machines with other devices, such as one or more table games, kiosks, accounting systems or servers, progressive systems or servers, player tracking systems or servers or the like.

Figure 7:
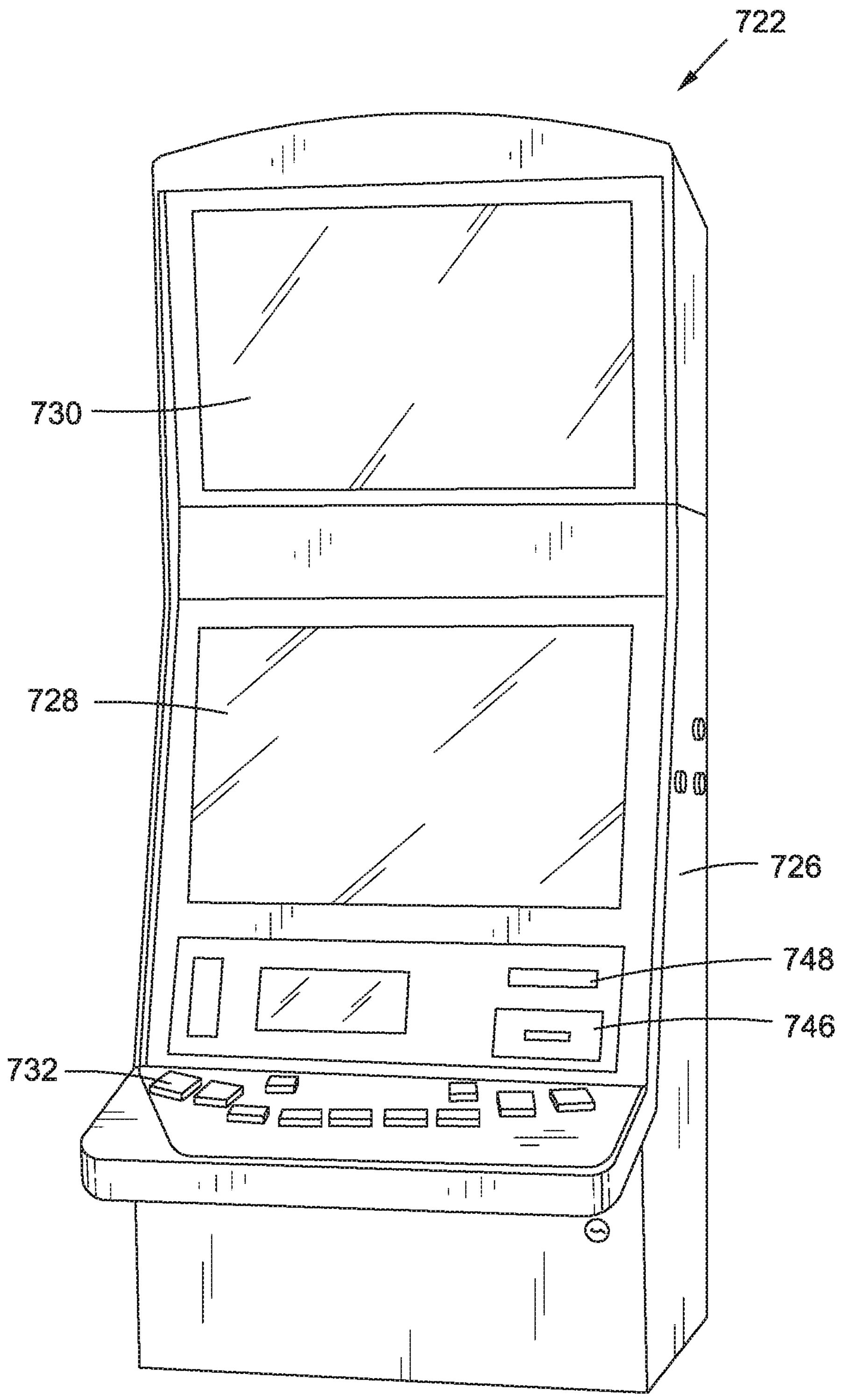
FIG. 7 shows a configuration of a gaming machine according to one exemplary embodiment.

One configuration of a gaming machine 722 is illustrated in FIG. 7. As illustrated, the gaming machine 722 generally comprises a housing or cabinet 726 for supporting and/or enclosing various components required for operation of the gaming machine. In the embodiment illustrated, the housing 726 includes a door located at a front thereof, the door capable of being moved between an open position which allows access to the interior, and a closed position in which access to the interior is generally prevented. The configuration of the gaming machine 722 may vary. In the embodiment illustrated, the gaming machine 722 has an "upright" configuration. However, the gaming machine 722 could have other configurations, shapes or dimensions (such as being of a "slant"-type, "bar-top" or other configuration as is well known to those of skill in the art).

The gaming machine 722 preferably includes at least one first display device 728 configured to display game information. The display device 728 may comprise an electronic video display such as a cathode ray tube (CRT), high resolution flat panel liquid crystal display (LCD), projection LCD, plasma display, field emission display, digital micromirror display (DMD), digital light processing display (DLP), LCD touchscreen, a light emitting display (LED) or other suitable displays now known or later developed, in a variety of resolutions, sizes and formats (e.g. 4:3, widescreen or the like). The display device 728 may be capable of projecting or displaying a wide variety of information, including images, symbols and other indicia or information associated with game play, game promotion or other events. The gaming machine 722 might include more than one display device, such as a main or first display device 728 and a secondary display device 730. The two or more display devices might be associated with the housing or, as illustrated in FIG. 7, the gaming machine 722 might also include a top box or other portion which includes the one or more second display devices 730. Also, the gaming machine 722 might include side displays (such as mounted to the exterior of the housing 726) and might include multiple displays of differing sizes.

As described in more detail below, the gaming machine 722 is preferably configured to present one or more games upon a player making a monetary payment or wager. In this regard, as described in more detail below, the gaming machine 722 includes mechanism or means for accepting monetary value.

In one embodiment, certain game outcomes (but preferably not all game outcomes) may be designated as winning outcomes (the non-winning outcomes may be referred to as losing outcomes). Prizes or awards may be provided for winning outcomes, such as monetary payments (or representations thereof, such as prize of credits), or promotional awards as detailed herein. As detailed below, the gaming machine 722 preferably includes a mechanism or means for returning unused monetary funds and/or dispensing winnings to a player.

The gaming machine 722 preferably includes one or more player input devices 732 (such as input buttons, plunger mechanisms, a touch-screen display, joystick, touch-pad or the like). These one or more devices 732 may be utilized by the player to facilitate game play, such as by providing input or instruction to the gaming machine 722. For example, such input devices 732 may be utilized by a player to place a wager, cause the gaming machine 722 to initiate a game, to select hands to be played or wagered against, or to provide various other inputs.

Figure 8:
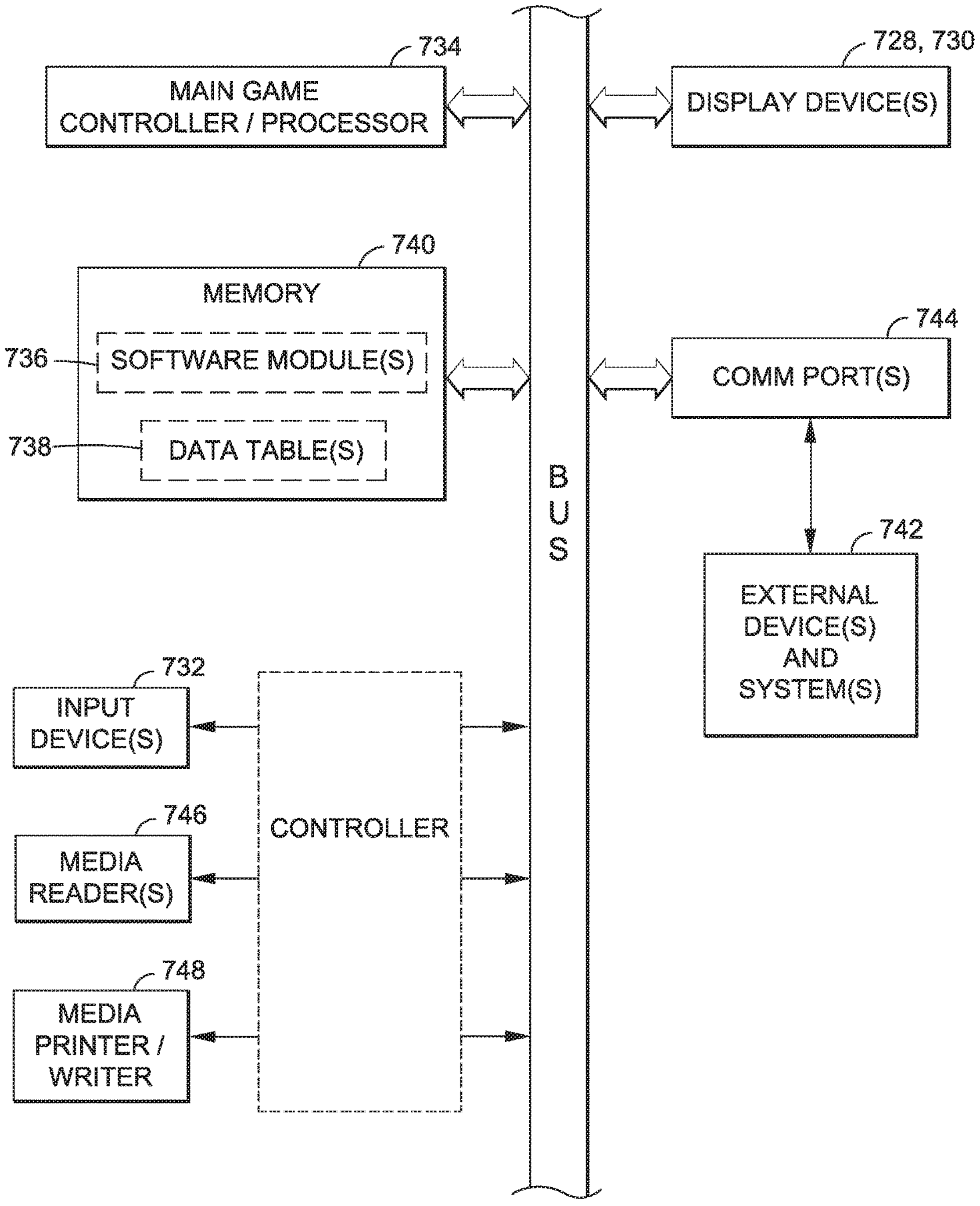
FIG. 8 shows a schematic of a gaming machine according to one exemplary embodiment.

Referring to FIG. 8, in one preferred embodiment, the gaming machine 722 includes at least one microprocessor or controller 734 for controlling the gaming machine, including receiving player input and sending output signals for controlling the various components or peripheral devices of the machine 722 (such as generating game information for display by the display devices 728, 730). The controller 734 may be arranged to receive information regarding funds provided by a player to the gaming machine 722, receive input such as a purchase/bet signal when a purchase/bet button is depressed, and receive other inputs from a player. The controller may be arranged to generate information regarding a game, such as generating game information for display by the at least one display device 728, 730 (such as information comprising cards dealt to a player and community cards dealt and exposed as detailed herein), for determining winning or losing game outcomes and for displaying information regarding awards for winning game outcomes, among other things.

The controller 734 may be configured to execute machine readable code or "software" or otherwise process information, such as obtained from a remote server. Software 736 or other instructions may be stored at a memory or data storage device 740, e.g. in a fixed or non-transitory configuration. The memory may also store other information or data 740, such as data stored in table 738 or other forms (including, but not limited to look-up tables, pay tables and other information including tracked game play information). The gaming machine 722 may also include one or more random number generators for generating random numbers (such as implemented by a random number generator software module stored in the memory 740 and executable by the processor 734), such as for use in dealing random playing cards and for presenting the game in a random fashion (e.g. whereby the game is presented in a manner in which the player cannot control the outcome) or pseudo-random fashion (e.g. such as where the game includes a skill component which can affect the outcome of the game).

Preferably, the controller 734 is configured to execute machine readable code or instructions (e.g. software) which are configured to implement the game. In this regard, the gaming machine 722 is specially configured to present the game of the invention via specific software and/or hardware which causes the gaming machine to operate uniquely. For example, the controller 734 of the gaming machine 722 may be configured to detect a wager, such as a signal from a player's depressing of the "bet one" button. Upon such an event and/or the player otherwise signaling the gaming machine to present the game, the controller may be configured to cause the at least one display 728 to display unique information, such as a unique graphical interface or unique game display, including game symbols or other game information. The controller may accept input from a player of game inputs, such as a request to spin reels or the like, via the one or more player input devices of the gaming machine 722. As indicated above, the machine-readable code may be configured in various manners, such as by having various "modules" of software which are designed to implement specific features of the game play or game presentation.

The gaming machine 722 may be configured to generate and present games in a stand-alone manner or it may be in communication with one or more external devices or systems 742 at one or more times. The gaming machine 722 might communicate with one or more of such external devices or systems 742 via one or more communication ports 744 or other interface devices. These ports or interface devices 744 may be configured to implement various communication protocols (including proprietary protocols) and communicate via wireless, wired or other communication link. For example, the gaming machine 722 may be configured as a server based device and obtain game code or game outcome information from a remote game server (in which event the gaming machine controller may receive game information from the server, such as game outcome information, and use that server-generated information to present the game at the gaming machine).

As indicated, the gaming machine 722 is configured to present one or more wagering games. The gaming machines 722 is preferably configured to accept value, such as in the form of coins, tokens, paper currency or other elements or devices representing value such as monetary funds. Thus, as indicated above, the gaming machine 722 preferably includes a mechanism or means for accepting monetary value. For example, the gaming machine 722 might include a coin acceptor for accepting coins. Of course, associated coin reading/verifying devices and coin storage devices may be associated with the gaming machine 722 if it is configured to accept coins. Likewise, as illustrated in FIGS. 7 and 8, the gaming machine 722 might include a media reader 746. Such a reader may be configured to accept and read/verify paper currency and/or other media such as tickets. Of course, in such event the gaming machine 722 may further be configured with one or more paper currency or ticket storage devices, such as cash boxes, and other paper currency or media handling devices (including transport devices).

The gaming machine 722 might also be configured to read FOBs, magnetic stripe cards or other media having data associated therewith and via which value or funds may be associated with the gaming machine 722. The mechanism for accepting monetary value might also comprise hardware and/or software which allows a player to transfer (such as electronically) funds from an account, such as a casino wagering account, or a bank or other financial institution account. Such a mechanism might include a communication interface which permits the gaming machine to communicate with a mobile phone, PDA, tablet or other electronic device of the player (such as via a physical interface or wired or wireless communications, such as to enable the transfer of funds from the player to the gaming machine or system.

When the player associates funds with the gaming machine or an associated system, a credit balance is generated. The credit balance may comprise a plurality of monetary value credits. The player may wager some or all of the associated monetary value, such as by wagering one or more of the credits associated with the credit balance. For example, the player might provide input to a wager button or touch screen interface to wager a certain number of credits (such as "Bet 1 Credit", "Bet 5 Credits", "Bet Maximum Credits" or other options). In one embodiment, when the player's wager is received, the player's credit balance is reduced by the number of wagered credits. The player might then provide a separate input to begin the game. In other embodiment, the player might select a "play game" input, such as by pressing a "spin" button, which input is taken to comprise both an instruction to place a wager (such as of a pre-set or pre-selected number of credits) and to start the game. Of course, other configurations may be implemented for accepting monetary value from the player and for allowing the player to place a wager from the associated monetary value.

In one embodiment, the gaming machine 722 is configured to award winnings for one or more winning wagering game outcomes. Such winnings may be represented as credits, points or the like. In one embodiment, the player may "cash out" and thus remove previously associated funds and any awarded winnings or such may otherwise be paid to the player. These winnings may be associated with the player's credit balance, thus increasing the player's credit balance.

In one embodiment, the player may provide an input to the gaming machine 722 to indicate their desire to cash out, such as by selecting a "cash out" button or touch screen feature or providing other input. In response, a monetary value represented by the player's credit balance or the like is preferably paid, transferred or otherwise provided to the player. For example, upon an award or at cash-out, associated funds may be paid to the player by the gaming machine 722 dispensing coins to a coin tray. In another embodiment, funds may be issued by dispensing paper currency or other media. In yet another embodiment, a player may be issued a media, such as a printed ticket, which ticket represents the value which was paid or cashed out of the machine. The aspects of gaming machine "ticketing" systems are well known. One such system is described in U.S. Pat. No. 6,048,269 to Burns, which is incorporated herein in its entirety by reference. In yet another embodiment, the cash-out might result in the dispensing of a card or other media which stores or represents the cashed-out funds, such as by writing funds information to a magnetic stripe of a card which is inserted into a media writer of the gaming machine or dispensed from the machine. In this regard, the gaming machine 722 may include one or more media printers or writers 748. In other embodiments, the cash-out mechanism may result in the funds value being transferred to an external device or account, such as a player's casino account (such as associated with a casino server), a remote bank or other financial account, or an electronic device such as a player's phone, PDA or tablet.

The gaming machine 722 may also include a player tracking device, such as a card reader and/or an associated keypad or other input device (such as a touch screen display). Such player tracking devices are well known and may permit the game operator to track play of players of the gaming machine. The tracked play may be utilized to offer player bonuses or awards.

As illustrated in FIG. 8, the main game controller or processor 734 may communicate with several of the peripheral devices via one or more intermediary controllers. For example, some of the peripheral devices might comprise USB type or enabled devices which are controlled by an intermediary USB controller.

A casino may have numerous such gaming machines 722, such as located on a casino floor or in other locations. Of course, such gaming machines 722 might be used in other environments, such as an airport, a bar or tavern or other locations.

It will be appreciated that the gaming machine illustrated in FIGS. 7 and 8 is only exemplary of one embodiment of a gaming machine. For example, it is possible to for the gaming machine to have various other configurations, including different shapes and styles and having different components than as just described.

For example, instead of comprising a "casino"-style gaming machine, it is possible for the game of the invention to be presented on a computing device, including at a home or office computer or a player's mobile electronic device such as a PDA, phone or the like. In one embodiment, a player might log in to a casino server and the controller of the casino server may cause game information to be delivered to the player's computer via a communication link and then be displayed on a display of the player's computer. The communication link might comprise or include the Internet, a casino network such as a wired or wireless LAN, or combinations of public and/or private networks including wired and/or wireless links. In such a configuration, it will be noted that the term "controller" may comprise more than one device. For example, in a server-based environment, a controller at a server may generate game information and transmit that information to a local controller at a gaming machine or a player's computer or other electronic device. The local controller at the gaming machine or the player's computer or other electronic device may then cause game information to be displayed on one or more associated displays.

The gaming machine 722 may, as noted above, be part of a system which includes other devices. For example, the gaming machine 722 may communicate with one or more casino systems, such as a player tracking server or system, an accounting system or server, a ticketing system, a bonusing system, a tournament system, other gaming machines, and external devices.

In use, a method of presenting a game is played out as follows:

A player selects a table position at the real or simulated criss cross poker casino card game layout 10 (e.g. plays a gaming machine, selects a position at an electronic and/or non-electronic gaming table, etc.).

An across ante 22A and a down ante 22B are input by each player in order to start the game. An optional five card bonus bet 23 according to betting limits set by the casino for minimum and maximum five card bonus bet amounts.

Five community cards, a community middle card 33, two outside horizontal community across cards 34A, and two outside vertical community down cards 34B are dealt face down in a criss cross poker configuration in the dealer area 30 for all players to use either the across cards 33 and 34A or the down cards 33 and 34B in combination with two player cards 34D dealt face down to each player to form an across poker hand and a down poker hand.

After the cards are dealt, a player may place an "Across Bet" 24A of one to three times the ante that the players two dealt cards 34D in combination with the three '"Across Cards" 33 and 34A form a winning five-card poker hand against a criss cross poker payout table 25, as shown in FIG. 3. Alternately, the player may fold and forfeit the two antes 22A and 22B. The two outside horizontal or across cards 34A are then turned over by the dealer or turned automatically by an electronic simulation device after all bets are placed.

A player may then place a "Down Bet" 24B that the player's two dealt cards 34D in combination with the three "Down Cards" 33 and 34B form a winning five-card poker hand against the criss cross poker payout table 25. Alternately the player may fold and forfeit the antes and the across bet. The two outside vertical or down cards 34B are then turned over by the dealer or automatically in the electronic simulations after all bets are placed.

At this time, the player may place a "Middle Bet" 24C that the player's two dealt cards 34D in combination with either the three community across cards 33 and 34A or the three community down cards 33 and 34B forms a winning hand, with the higher hand being paid out according to the criss cross poker payout table 25. Alternately the player may fold and forfeit the antes, the across bet, and the down bet. The dealer or electronic simulation device then turns over the middle community card 33 after all bets are placed.

After the middle card 33 is turned up, all winning bets are paid: the across bet 24A, the down bet 24B, and the middle bet 24C are paid according to a criss cross poker payout table 25. The across ante 22A and the down ante 22B are paid according to the ante payout table 26. If the five community cards 33, 34A and 34B of the criss cross community card configuration together as a five card poker hand is a winning hand, the five card bonus bets 23 are paid according to a five card bonus payout table 27.

The additional middle bet 24C and the optional five card bonus bet 23 are played with the same cards as the criss cross poker casino card game and do not affect the play of the criss cross poker casino card game. They provide additional betting opportunities in the criss cross poker casino card game.

While in one embodiment separate across and down ante wagers are required, in other embodiments, a player might only be required to place a single ante wager.

In other embodiments, the game play may be adjusted to increase the speed of play and/or provide variety to the players. In one embodiment, the game is presented as outlined above with at least one ante wager being received from the player(s), two cards being dealt to the player(s), and the five community cards being dealt in a criss cross pattern. Here, one of the horizontal community cards and one of the vertical community cards may then be revealed to the player(s). Based on the player's cards and the revealed community cards, the player may place a play wager on one of the horizontal hand formed by the horizontal community cards and the player's cards and the vertical hand formed by the vertical community cards and the player's cards. The player may also have the option of folding where the player does not select one of the horizontal and the vertical hand and forfeits the at least one ante wager.

Once the bet is received, the remaining community cards are exposed. The ante wagers and the play wager are then collected or paid out. In one embodiment, the ante wagers and play wager win when the player's hand pick beats the other hand (for example the vertical hand beats the horizontal hand). Additionally, in some embodiments the player's hand pick is paid according to a pay table, such as one or more of pay tables 25 or 26 shown in FIG. 3. In some embodiments, the player's hand pick is only paid when the hand has at least a minimum predetermined rank. In some embodiments, the player's hand pick is paid based on a combination of two or all of these factors. The optional five card bonus bet may be offered along with the above described game.

In another embodiment, a seven-card variation is provided. Here, the game is presented as outlined above with at least one ante wager being received from the player(s), two cards being dealt to the player(s), and the five community cards being dealt in a criss cross pattern. At this point, a first card in the community cards is revealed, such as the middle card. With the first card being revealed, the player has the option of a making a first play wager or forfeiting the ante wager(s) (folding) and ending the game.

When the first play wager is received, two more community cards are revealed. For example, the two vertical community cards or the two horizontal community cards are revealed. With three of the five community cards now revealed, the player has the option of making a second play wager or forfeiting the ante wager(s) and the first play wager (folding) and ending the game.

When the second play wager is received, the final two community cards are revealed. For example, the remaining two of the vertical or horizontal community cards are revealed. With all five community cards now revealed, the player has the option of making a third and final play wager or forfeiting the ante wager(s), the first play wager, and the second play wager (folding) and ending the game. When the player elects to make the third play wager, the player's wagers are resolved based on a seven-card hand formed by the players two cards and the five community cards. The seven-card hand is compared to a predetermined pay table to award prizes for a winning hand.

It is understood that the preceding description is given merely by way of illustration and not in limitation of the invention and that various modifications may be made thereto without departing from the spirit of the invention as claimed.

What is claimed is:

1. A gaming machine comprising:
- a monetary funds accepting mechanism for accepting a physical item associated with a monetary value to fund a player credit balance;
- at least one display device;
- at least one player input device;
- a memory device;
- a controller; and
- machine-readable code stored in said memory device, which when executed by said controller, causes said gaming machine to:
  - receive an ante wager from a player at the gaming machine via the at least one player input device to initiate play of a criss cross poker game;
  - deal two cards to the player from at least one deck of virtual playing cards and display the two cards dealt to the player on the at least one display device;
  - deal five community cards from the at least one deck of virtual playing cards and display the five community cards face down, the five community cards being dealt in a cross formation having a middle card and two horizontal outside cards forming a horizontal across partial hand, and having two vertical outside cards disposed above and below the middle card forming a vertical down partial hand;
  - expose one of the two horizontal outside cards and one of the two vertical outside cards and display the exposed one of the two horizontal outside cards and the exposed one of the two vertical outside cards face up on the at least one display device;
  - receive a play wager from the player designating a hand from one of the horizontal across partial hand and the vertical down partial hand;
  - expose the remainder of the five community cards and displaying the five community cards face up on the at least one display device;
  - award the player when the designated hand in combination with the two cards dealt to the player outrank the other of the horizontal across partial hand and the vertical down partial hand combined with the two cards dealt to the player that was not designated.

2. The gaming machine of claim 1, wherein the player is awarded according to a predetermined pay table.

3. The gaming machine of claim 2, wherein the play wager upon a winning outcome is paid 500 to 1 for a royal flush, 100 to 1 for a straight flush, 30 to 1 for four of a kind, 12 to 1 for a full house, 8 to 1 for a flush, 5 to 1 for a straight, 3 to 1 for three of a kind, 2 to 1 for two pair, 1 to 1 for a pair of jacks or better, and a push for a pair of 6s through a pair of 10s.

4. The gaming machine of claim 1, wherein the player is awarded only if the designated hand achieves a predetermined rank.

5. The gaming machine of claim 4, wherein the predetermine rank is a pair of 6s or higher.

6. A method for presenting a game at an electronic gaming device comprising a monetary funds accepting mechanism for accepting a physical item associated with a monetary value to fund a player credit balance, at least one display device, and at least one player input device, the method comprising:
- receiving an ante wager from a player via the at least one player input device to initiate play of a criss cross poker game;
- dealing two cards to the player from at least one deck of playing cards;
- dealing five community cards from the at least one deck of playing cards face down, the five community cards being dealt in a cross formation having a middle card and two horizontal outside cards forming a horizontal across partial hand, and having two vertical outside cards disposed above and below the middle card forming a vertical down partial hand;
- exposing one of the two horizontal outside cards and one of the two vertical outside cards to be facing up;
- receiving a play wager from the player designating a hand from one of the horizontal across partial hand and the vertical down partial hand;
- exposing the remainder of the five community cards to be face up;
- awarding the player when the designated hand in combination with the two cards dealt to the player outrank the other of the horizontal across partial hand and the vertical down partial hand combined with the two cards dealt to the player that was not designated.

7. The method of claim 5, wherein the player is awarded according to a predetermined pay table.

8. The method of claim 5, wherein the play wager upon a winning outcome is paid 500 to 1 for a royal flush, 100 to 1 for a straight flush, 30 to 1 for four of a kind, 12 to 1 for a full house, 8 to 1 for a flush, 5 to 1 for a straight, 3 to 1 for three of a kind, 2 to 1 for two pair, 1 to 1 for a pair of jacks or better, and a push for a pair of 6s through a pair of 10s.

9. The method of claim 5, wherein the player is awarded only if the designated hand achieves a predetermined rank.

10. The method of claim 5, wherein the predetermine rank is a pair of 6s or higher.

11. A method for presenting a game at an electronic gaming device comprising a monetary funds accepting mechanism for accepting a physical item associated with a monetary value to fund a player credit balance, at least one display device, and at least one player input device, the method comprising:

receiving an ante wager from a player via the at least one player input device to initiate play of a criss cross poker game;

dealing five community cards from the at least one deck of playing cards face down, the five community cards being dealt in a cross formation having a middle card and two horizontal outside cards forming a horizontal across partial hand, and having two vertical outside cards disposed above and below the middle card forming a vertical down partial hand;

revealing a first card of the five community cards;

receiving a first play wager from the player to continue with the game or receiving an election from the player to fold;

revealing a second and third card of the five community cards;

receiving a second play wager from the player to continue with the game or receiving the election from the player to fold;

revealing the remaining community cards;

receiving a third play wager from the player to continue with the game or receiving the election from the player to fold; and awarding the player based on a seven card poker hand based on the player's two cards and the five community cards according to a predetermined pay table.

* * * * *